March 7, 1961 P. MORF 2,973,618
SHOCK-ABSORBING PIVOT BEARING
Filed Jan. 5, 1959
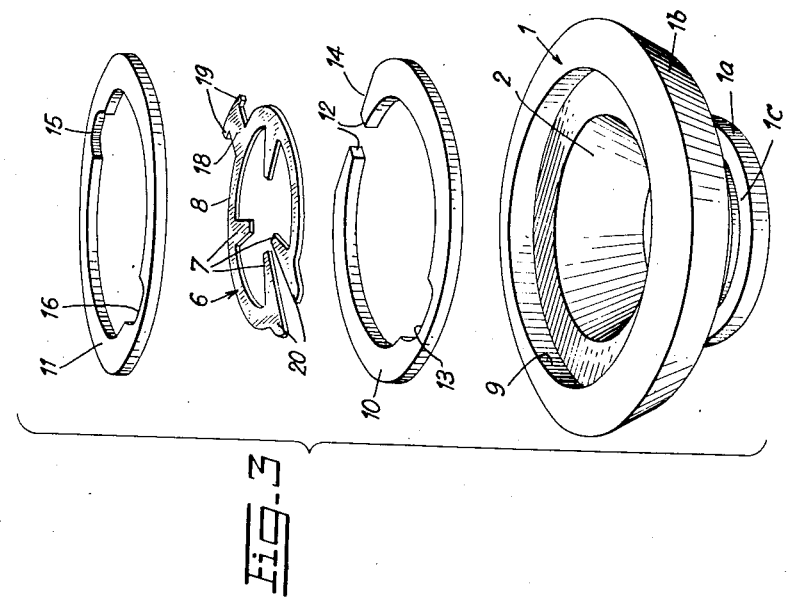
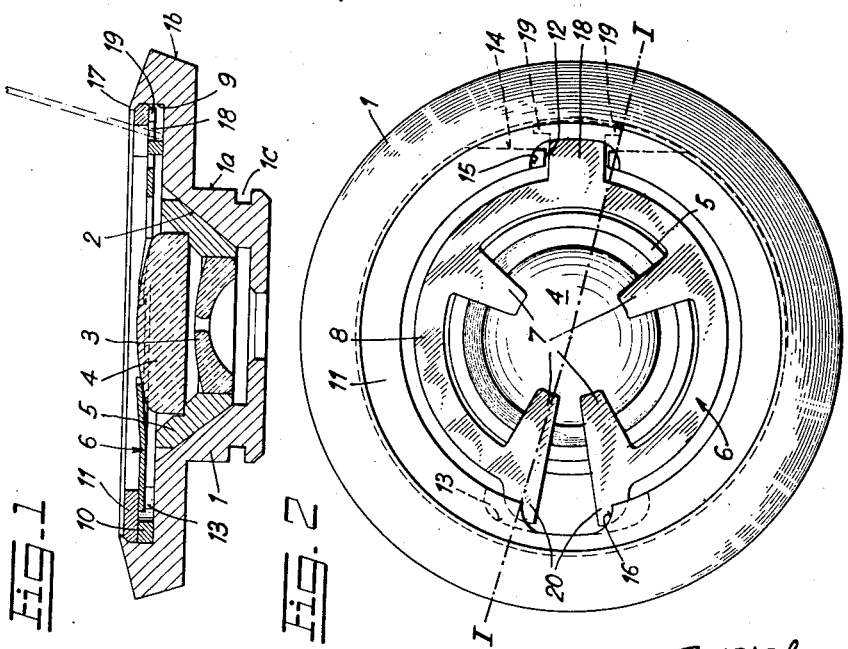
INVENTOR.
PIERRE MORF
BY MICHAEL S. STRIKER
ATTORNEY

United States Patent Office 2,973,618
Patented Mar. 7, 1961

2,973,618
SHOCK-ABSORBING PIVOT BEARING
Pierre Morf, 15 Beauregard, La Chaux-de-Fonds NE., Switzerland Filed Jan. 5, 1959, Ser. No. 784,959

Claims priority, application Switzerland Jan. 11, 1958

5 Claims. (Cl. 58—140)

This invention relates to shock-absorbing pivot bearings and in particular to pivot bearings comprising a return spring mounted on a body member and hinged thereto for rocking motion between a locking position in which it elastically holds the pivot holding means of the bearing in a predetermined position within said body member, and an opened position in which said pivot holding means can be removed from said body member.

In the shock-absorbing pivot bearings of this type which are known in the art, the return spring is formed by a flat resilient split ring carrying radial projections extending from its outer peripheral edge and located near its free ends, a radial tail portion extending also from its outer peripheral edge diametrically opposite said radial projections, and a pair of lateral projections extending each from one side edge of said tail portion at the free end thereof, and the bearing body comprises a first pair of shoulders for removably retaining the radial projections of said split ring when the return spring is in locking position, and a second pair of shoulders for permanently retaining the lateral projections of the tail portion of said split ring when the return spring is rocking between its locking and its opened positions.

The main advantage of these bearings known in the art is to enable removing the pivot holding means from the body member in a very easy manner while preventing the return spring from jumping away.

These known bearings have, however, the drawback that their body member cannot be manufactured easily so that these bearings are expensive.

It is therefore an object of this invention to provide a shock-absorbing pivot bearing of the particular type indicated which can be manufactured easily.

It is also in particular an object of the invention to provide a bearing of said type in which the parts of the body member serving either as locking or as hinging means for the return spring can be manufactured easily.

A further object of the invention consists in providing the body member of the bearing with a cylindrical lodging, in setting a first ring into said lodging, said first ring being provided with cutouts arranged for receiving the tail portion and the radial and lateral projections of the return spring, in setting a second ring into said lodging and on said first ring, and in fixing said rings to said body member, said second ring covering at least a part of the cutouts of said first ring to retain the lateral projections of the return spring permanently and the radial projections thereof normally within the cutouts of said first ring.

Still further objects of the invention will become apparent in the course of the following description.

One embodiment of the shock-absorbing pivot bearing according to the invention is represented diagrammatically and by way of example in the annexed drawings.

In the drawings:

Fig. 1 is a sectional view along line I—I of Fig. 2 of this embodiment,

Fig. 2 is a plane view thereof, and

Fig. 3 an exploded perspective view of some elements of this bearing.

The bearing represented in the drawings is intended for journalling the upper pivot of the balance wheel of a watch. It comprises a body member 1 formed with a lower portion 1a engaged in a corresponding bore of the balance cock (not shown) and with a truncated conical enlarged portion 1b to provide for pivotally mounting the usual regulator (not shown) on the cock. A holder (not shown) entering the groove 1c holds the body member 1 in place in the bore of the cock.

The body member 1 is provided with a first lodging having a conical side face 2 which forms a centering seat for a movable unit composed of a pierced jewel 3, a cap jewel 4 and a metallic setting 5 carrying both jewels. A return spring 6 substantially formed by a flat resilient split ring 8 acts on the cap jewel 4 by means of inner tongues 7 projecting from said split ring to hold normally said movable unit in a predetermined centered position with respect to the body member 1.

Above the first conical lodging 2 the body member 1 is provided with a second cylindrical lodging 9 in which the two rings 10 and 11 are set. The ring 10 is a split ring having thus two free ends 12 facing one another and forming a gap therebetween. Moreover, this ring 10 is provided with an elongated cutout 13 diametrically opposite said gap and it has a straight outer edge 14 near its ends 12. As regards ring 11, it is provided with two diametrically opposite cutouts 15 and 16. The rings 10 and 11 are set into the lodging 9 so that the cutout 15 of ring 11 and the gap between the ends 12 of ring 10 are superposed, and so that the cutouts 13 and 16 are also superposed, the cutout 16 being narrower than the cutout 13. Both rings 10 and 11 are retained in the lodging 9 and thus rigidly fixed to the body member 1 by a rim 17 formed by bending the upper edge of the lodging 9 inward.

The return spring 6 comprises a tail portion 18 projecting radially from the outer peripheral edge of the split ring 8 and this tail portion 18 carries a pair of lateral projections 19 at its free end extending each on one side thereof. As shown in particular in Fig. 2, the tail portion 18 is somewhat narrower than the gap formed between the ends 12 of ring 10 but the distance between the free ends of the lateral projections 19 is larger than said gap. The split ring 8 of spring 6 extends within ring 10 concentric thereto; the tail portion 18 is located in the gap formed between ends 12 and the lateral projections 19 extend within the free space formed between the cylindrical side wall of lodging 9 and the straight edge 14 of ring 10. The lateral projections 19 are permanently retained in said free space by ring 11 which partly covers said space, and the spring 6 can no more be removed from the body member 1 once it has been set in place together with rings 10 and 11. As it can be observed in Fig. 1, the spring 6 is thinner than ring 10 so that it can freely rock about an axis parallel to the lateral projections 19. The rocking motion of the return spring 6 with respect to the body member 1 of the bearing is enabled by the cutout 15 of ring 11 which permits of the spring rocking from its locking position (represented in full lines in Fig. 1) towards its opened portion (represented in dot-and-dash lines in Fig. 1) and vice versa.

When the return spring has been rocked in the latter position, the movable unit 3, 4, 5 of the bearing can be removed from its conical lodging 2.

The return spring 6 is held in locking position by means of two radial projections 20 extending from the outer peripheral edge of the split spring 8 and located near the free ends thereof. It can be observed in Fig. 2 that these radial projections 20 freely extend into the cutout 13 of ring 10 and that they are normally retained therein by the ring 11.

To remove the return spring 6 from its locking position, the two inner tongues 7 situated near the free ends of split ring 8 need only be moved against one another, for instance by means of tweezers, thus closing somewhat ring 8, until the projections 20 may pass through the cutout 16 of ring 11. The spring 6 can, of course, be unlocked by passing the radial projections 20 either simultaneously or successively through the opening 16 of ring 11. To set spring 6 in locking position, the projections 20 are introduced under the parts of ring 11 which extend over the cutout 13 of ring 10, by a similar action on said tongues 7.

The bearing described above is very easy to manufacture since its body member 1 can be turned out of a bar on a full automatic lathe and since the rings 10 and 11 forming both the locking and the hinging means of the return spring 6 can merely be punched out of a sheet metal.

Although I have described in detail one embodiment of my invention, it should be understood that various changes in the shape, sizes and arrangement of parts could be resorted to without departing from the spirit of the invention or sacrificing the advantages thereof.

I claim:

1. In a shock-absorbing pivot bearing for apparatus, timepieces, watches and the like, the combination of a body member, a cylindrical lodging formed in said body member, a first ring provided with cutouts and located in said lodging, a second ring also located in said lodging, on said first ring, and rigidly fixed to said body member, and a return spring formed by a resilient split ring having thus two free ends and carrying outer radial projections near its free ends, an outer radially extending tail portion diametrically opposite said radial projections and a pair of lateral projections extending from said tail portion, said radial projections, said tail portion and said lateral projections thereof being normally located in the cutouts of said first ring, said second ring covering at least partly the cutouts of said first ring so as to retain said radial projections removably in one of said cutouts, and said lateral projections rockably in another one of said cutouts, thus permitting of said return spring rocking from a locking position toward an opened position and vice versa.

2. The combination of claim 1, said second ring being provided with a first cutout located above said tail portion of said return spring and with a diametrically opposite second cutout located between said radial projections of said split ring, said first cutout of said second ring being wider than said tail portion but smaller than the distance between the free ends of said lateral projections, and said second cutout having a width enabling said radial projections of said split ring to pass therethrough upon closing said split ring.

3. The combination of claim 1, said first ring being a split ring having its free ends forming a gap wider than said tail portion, but smaller than the distance between the free ends of said lateral projections, said tail portion of said return spring being located in said gap.

4. The combination of claim 1, said first ring being provided with a cutout having a width at least equal to the distance between said radial projections of said resilient split ring so that said radial projections freely extend in said cutout.

5. In a shock-absorbing pivot bearing for timepieces or the like, in combination, a hollow body member formed at an inner surface thereof with an annular groove open toward the axis of the groove, said groove having in direction of said axis a given height; a first ring in form of a split ring located in said groove and having two spaced free ends defining a gap therebetween and being formed opposite said gap with a first cutout extending outwardly from the inner surface of said first ring and on each of said free ends with additional cutouts extending inwardly from the outer surface of said first ring; a second ring located in said groove on said first ring and being formed with a pair of cutouts extending outwardly from the inner surface of said second ring and being respectively aligned with said gap and said first cutout of said first ring, said first and second rings having a combined height equal to the height of said groove so as to be fixedly retained therein; and a return spring formed by a resilient split ring having two free ends defining a space therebetween and being formed at each of the free ends thereof with an outer radially extending projection, said resilient split ring having further a radially extending tail portion smaller than said gap and extending opposite said space outwardly from said resilient split ring and having at the outer free end thereof a pair of laterally extending projections, said tail portion being located in said gap of said first ring and said laterally extending projections being located respectively in said additional cutouts of said first ring, whereas said outer radially extending projections being normally located in said first cutout of said first ring, said second ring covering at least partly said cutouts of said first ring to hold said projections of said return spring in said cutouts of said first ring and so that when said free ends of said return spring are pressed together the outer radially extending projections thereon may be removed from said first cutout of said first ring thus permitting said return spring to tilt about the tail end thereof from a locking position towards an open position and vice versa.

References Cited in the file of this patent

UNITED STATES PATENTS

| 2,233,743 | Marti | Mar. 4, 1941 |

FOREIGN PATENTS

| 294,057 | Switzerland | Jan. 4, 1954 |
| 303,341 | Switzerland | Feb. 1, 1955 |
| 1,130,140 | France | Sept. 17, 1956 |